(12) United States Patent
Baehr-Jones et al.

(10) Patent No.: US 10,594,404 B2
(45) Date of Patent: Mar. 17, 2020

(54) OPTICAL DUAL RESONATOR MODULATION SYSTEM AND METHOD, AND OPTICAL DUAL RESONATOR MODULATOR THEREFOR

(71) Applicant: Elenion Technologies, LLC, New York, NY (US)

(72) Inventors: Thomas Wetteland Baehr-Jones, Arcadia, CA (US); Michael J. Hochberg, New York, NY (US); Yang Liu, Elmhurst, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/548,990

(22) Filed: Aug. 23, 2019

(65) Prior Publication Data

US 2019/0379460 A1 Dec. 12, 2019

Related U.S. Application Data

(63) Continuation of application No. 16/033,369, filed on Jul. 12, 2018, now Pat. No. 10,439,728, which is a continuation of application No. 15/704,895, filed on Sep. 14, 2017, now Pat. No. 10,044,443, which is a
(Continued)

(51) Int. Cl.
*H04B 10/516* (2013.01)
*G02F 1/313* (2006.01)

(52) U.S. Cl.
CPC ......... *H04B 10/516* (2013.01); *G02F 1/3132* (2013.01); *G02F 2203/15* (2013.01)

(58) Field of Classification Search
CPC .. H04B 10/516; H02F 1/3132; H02F 2203/15
See application file for complete search history.

(56) References Cited

U.S. PATENT DOCUMENTS

| 7,805,026 B2* | 9/2010 | Gill | G02F 1/225 |
| | | | 385/2 |
| 2014/0023309 A1* | 1/2014 | Jiang | G02F 1/3133 |
| | | | 385/3 |

(Continued)

*Primary Examiner* — Dzung D Tran
(74) *Attorney, Agent, or Firm* — Stratford Managers Corporation

(57) ABSTRACT

Described are various embodiments of a dual optical modulator, system and method. In one embodiment, an optical modulator modulates an input optical signal having a designated optical frequency. The modulator comprises first and second tunable modulators operable around the optical frequency and operatively disposed between a bus waveguide path and an opposed waveguide path. The modulator further comprises a relative optical phase-shifter optically coupled between the tunable modulators so as to impart a relative optical phase shift between the bus waveguide path and the opposed waveguide path. The tunable modulators are respectively driveable to modulate a respective resonance thereof in complimentary directions relative to the optical frequency and thereby resonantly redirect a selectable portion of the input optical signal along the opposed waveguide path such that the relative optical phase shift is imparted thereto for output. Embodiments of an optical modulation method and an IQ modulator are also described.

20 Claims, 10 Drawing Sheets

Related U.S. Application Data continuation of application No. 14/945,529, filed on Nov. 19, 2015, now Pat. No. 9,787,405.

(56) References Cited

U.S. PATENT DOCUMENTS

| | | | |
|---|---|---|---|
| 2014/0159826 A1* | 6/2014 | Phan Le | H03B 5/30 331/154 |
| 2015/0054589 A1* | 2/2015 | Ward | G11C 5/005 331/18 |
| 2015/0055910 A1* | 2/2015 | Liang | G02F 1/025 385/2 |
| 2016/0238791 A1* | 8/2016 | Djordjevic | G02F 1/2257 |

* cited by examiner

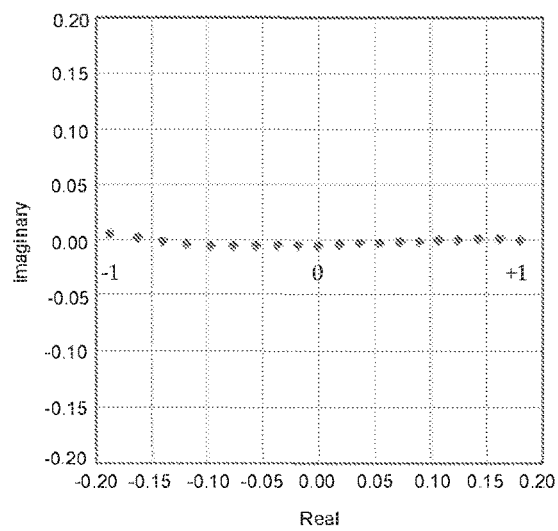
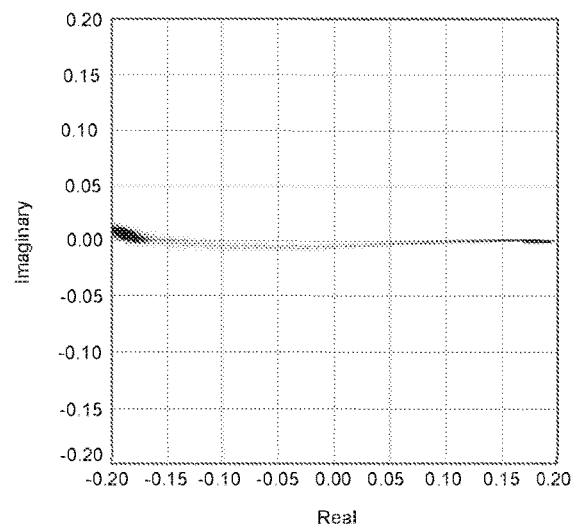
FIGURE 4A
FIGURE 4B

OPTICAL DUAL RESONATOR MODULATION SYSTEM AND METHOD, AND OPTICAL DUAL RESONATOR MODULATOR THEREFOR

FIELD OF THE DISCLOSURE

This application is a continuation U.S. patent application Ser. No. 16/033,369, now allowed, which is a continuation of U.S. patent application Ser. No. 15/704,895, filed Sep. 14, 2017, now U.S. Pat. No. 10,044,443, which is a continuation of U.S. patent application Ser. No. 14/945,529, filed Nov. 19, 2015, now U.S. Pat. No. 9,787,405, which applications are incorporated herein by reference in their entirety.

The present disclosure relates to optical modulation systems, and, in particular, to an optical dual resonator modulation system and method, and an optical dual resonator modulator therefor.

BACKGROUND

There is currently widespread interest in coherent technologies due to the increasing requirements for transmission-capacity in wavelength division multiplexing (WDM) systems. For instance, coherent optical fiber communication systems are known to allow for the utilization of high spectral efficiency modulation formats such as multilevel quadrature amplitude modulation or m-ary phase shift keying.

Quadrature (IQ) modulators generally output modulated transmission signals on two phase-shifted carrier waves. The two carrier waves are out of phase with each other by 90 and are thus called quadrature carriers or quadrature components. The modulated waves are summed, and the final waveform is a combination of both phase-shift keying (PSK) and amplitude-shift keying (ASK). Coherent Quadrature PSK (QPSK) and Quadrature Amplitude Modulators (QAM) are routinely implemented in optical communication systems using a pair of Mach-Zehnder modulators (MZM), the output of one being phase-shifted 90 degrees relative to the output of the other to provide each of the required quadrature components of the combined IQ modulator. Common implementations include known travelling wave Mach-Zehnder (TWMZ) modulators For instance, Mach-Zehnder type modulators are commonly nested in a variety of different material platforms (e.g., InP, GaAs, Si, and LiNbO3) to generate the coherent optical transmission signals in coherent quadrature modulation systems. The existing Mach-Zehnder type modulators are usually long (e.g., from 5 mm up to a few centimeters) because of the relatively weak electro-optic effect involved, and thus require sophisticated traveling-wave designs for high frequency operation.

Nested electro-absorption modulators have also been demonstrated to generate an optical differential quadrature phase shift keying (DQPSK) transmission signal, such as described in U.S. Pat. No. 7,403,670.

While some have proposed the use of a single ring resonator modulator to replace current Mach-Zehnder modulators to achieve PSK modulation, the proposed implementations suffer several drawbacks, such as relatively high operation losses, nonlinear phase transitions unsuitable for coherent transmission implementations, and a general unsuitability for high-order modulation formats such as 4-PSK and 16QAM. Even for relatively simple modulation formats like QPSK, in the context of long haul optical transmission, a linear response of the optical transmitter is vital in order to enable advanced signal processing such as pre-emphasizing and pulse shaping, among others.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for an optical modulation system and method that overcome some of the drawbacks of known techniques, or at least, provide a useful alternative thereto. For example, such need exists for a coherent optical modulation transmission system and method, and modulator therefor. Some aspects of this disclosure provide examples of such transmission signal modulation systems.

In accordance with one aspect, there is provided an optical modulator for modulating an input optical signal, the modulator comprising: a first optical resonator comprising an input port for receiving the input optical signal, a through port, and a drop port; a second optical resonator comprising a first input port optically coupled via a bus waveguide path to the through port of the first optical resonator, a second input port optically coupled via an opposed waveguide path to the drop port of the first optical resonator, and an output port operable as a through port and a drop port for optical signals received respectively at the first and second input ports of the second optical resonator; and a relative optical phase-shifter optically coupled between said first and second optical resonators so to impart a relative optical phase shift between said bus waveguide path and said opposed waveguide path.

In some embodiments, at least one of said first and second optical resonators comprises one of a ring resonator, a distributed Bragg grating resonator, and a photonic crystal resonator. In some embodiments, the first optical resonator comprises a first ring resonator and the second optical resonator comprises a second ring resonator. In some embodiments, each of the first and second ring resonators is a tunable ring resonator, biasable relative to an optical frequency of the input optical signal and respectively driveable to variably shift a respective resonance thereof relative to the optical frequency. In some embodiments, the first and second ring resonators are either: a) of a substantially similar polarity for being driven by anti-correlated RF signals; or b) of substantially reverse polarities for being driven by correlated RF signals. In some embodiments, each of the tunable ring resonators comprises a thermal tuner for biasing a respective transmission spectrum offset relative to the optical frequency, and a drive tuner for variably shifting the respective transmission spectrum relative to the optical frequency. In some embodiments, said relative optical phase-shifter comprises a static 180-degree phase shifter. In some embodiments, said relative optical phase-shifter comprises a phase modulator. Some embodiments further comprise a variable optical attenuator optically coupled between said first and second optical resonators along at least one of said bus waveguide path and said opposed waveguide path. In some embodiments, the modulator is arranged to modulate the input optical signal for use in at least one of a BPSK, QPSK, 8QAM, 16QAM, pure ASK, pure PSK, and higher order modulation scheme.

In accordance with another aspect, there is provided an optical transmitter for transmitting an optical signal, the transmitter comprising: a coherent light source for generating an input optical signal; an optical modulator comprising a first optical resonator having an input port for receiving the input optical signal, a through port, and a drop port, a second optical resonator having a first input port optically coupled via a bus waveguide path to the through port of the first optical resonator, a second input port optically coupled via an opposed waveguide path to the drop port of the first optical resonator, and an output port operable as a through port and a drop port for optical signals received respectively at the first and second input ports of the second optical resonator, and a relative optical phase-shifter optically coupled between said first and second optical resonators so to impart a relative optical phase shift between said bus waveguide path and said opposed waveguide path; and a digital signal processor for driving the optical modulator.

In some embodiments, each of the first and second optical resonators is a tunable resonator, biasable relative to an optical frequency of the input optical signal and driveable to variably shift a respective resonance thereof relative to the optical frequency. In some embodiments, the coherent light source is tunable, generating a wavelength variable input optical signal, and at least one of the first and second optical resonators is a tunable optical resonator, biasable relative to a variable optical frequency of the input optical signal and drivable to variably shift a respective resonance thereof relative to the optical frequency. In some embodiments, the first and second optical resonators are either: a) of a substantially similar polarity for being driven by anti-correlated RF signals; or b) of substantially reverse polarities for being driven by correlated RF signals. In some embodiments, each of the tunable resonators comprises a thermal tuner for biasing a respective transmission spectrum offset relative to the optical frequency, and a drive tuner for variably shifting the respective transmission spectrum relative to the optical frequency. In some embodiments, the transmitter is arranged to modulate the input optical signal for use in at least one of a BPSK, QPSK, 8QAM, 16QAM, pure ASK, pure PSK, and higher order modulation scheme.

In accordance with a further aspect, there is provided a method for modulating an input optical signal of a coherent light source, the method comprising: receiving at an input port of a first optical resonator the input optical signal, the first optical resonator having a through port optically coupled via a bus waveguide path to a first input port of a second optical resonator, the first optical resonator having a drop port optically coupled via an opposed waveguide path to a second input port of the second optical resonator, a relative optical phase-shifter optically coupled between said first and second optical resonators so to impart a relative optical phase shift between said bus waveguide path and said opposed waveguide path; combining an optical signal which comprises a first portion of the input optical signal which passes through the through port of the first optical resonator and an output port of the second resonator acting as a through port and a second portion of the input optical signal which passes through the drop port of the first optical resonator and the output port of the second resonator acting as a drop port; modulating at least one of a wavelength of the input optical signal, a transmission spectrum of the first optical resonator, and a transmission spectrum of the second optical resonator, such that a wavelength difference between the wavelength of the input optical signal and a wavelength of a resonant peak of the transmission spectrum of the first optical resonator is the same magnitude and the opposite sign of a wavelength difference between the wavelength of the input optical signal and a wavelength of a resonant peak of the transmission spectrum of the second optical resonator.

In accordance with yet another aspect, there is provided a method for modulating an input optical signal of a coherent light source optically coupled through a first optical resonator and a second optical resonator to an optical output, the method comprising: modulating at least one of a wavelength of the input optical signal, a transmission spectrum of the first optical resonator, and a transmission spectrum of the second optical resonator, such that a first wavelength difference between the wavelength of the input optical signal and a wavelength of a resonant peak of the transmission spectrum of the first optical resonator is the same magnitude and the opposite sign of a second wavelength difference between the wavelength of the input optical signal and a wavelength of a resonant peak of the transmission spectrum of the second optical resonator.

In accordance with another further aspect, there is provided an optical communication system, the system comprising: a coherent light source for generating an input optical signal; an optical modulator comprising a first optical resonator having an input port for receiving the input optical signal, a through port, and a drop port, a second optical resonator having a first input port optically coupled via a bus waveguide path to the through port of the first optical resonator, a second input port optically coupled via an opposed waveguide path to the drop port of the first optical resonator, and an output port operable as a through port and a drop port for optical signals received respectively at the first and second input ports of the second optical resonator, and a relative optical phase-shifter optically coupled between said first and second optical resonators so to impart a relative optical phase shift between said bus waveguide path and said opposed waveguide path; a digital signal processor for driving the modulator; an optical fiber optically coupled to the output port of the second resonator and an input port of an optical receiver.

In accordance with yet a further aspect, there is provided an IQ modulator comprising a first and a second optical modulator as defined above and having respective modulator outputs, and a 90-degree optical phase shifter optically coupled at one of said respective modulator outputs so to impart a relative 90-degree phase shift therebetween before said respective outputs are combined into an IQ modulated output.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein:

FIG. 4A is a complex plane plot of an output optical signal of the dual ring modulator of FIG. 1, showing a substantially linear variation thereof between a "−1" state and a "1" state on the complex plane as a function of varying differential RF drive voltages applied to respective ring resonators of the modulator, achieving binary phase shift keying (BPSK) modulation.

FIG. 4B is a complex plane plot illustrating the constellation of BPSK modulation of the dual ring modulator of FIG. 1.

DETAILED DESCRIPTION

The systems and methods described herein provide, in accordance with different embodiments, different examples in which a pair of optical modulators can be interconnected and operated so as to generate a coherently modulated optical signal. As will be described in greater detail below, the dual modulator can be operated to produce a relatively linear transition in the complex plane as a function of drive voltage thereby allowing for the controlled generation of discrete coherent modulation states, which controlled behavior is desirable in the formation of respective quadrature components in an IQ modulator, for example. Consequently, the concurrent and 90 degree phase-shifted implementation of parallel dual ring modulators as described herein may be used as an IQ modulator, thus providing an alternative to standard MZM implementations.

Figure 1:
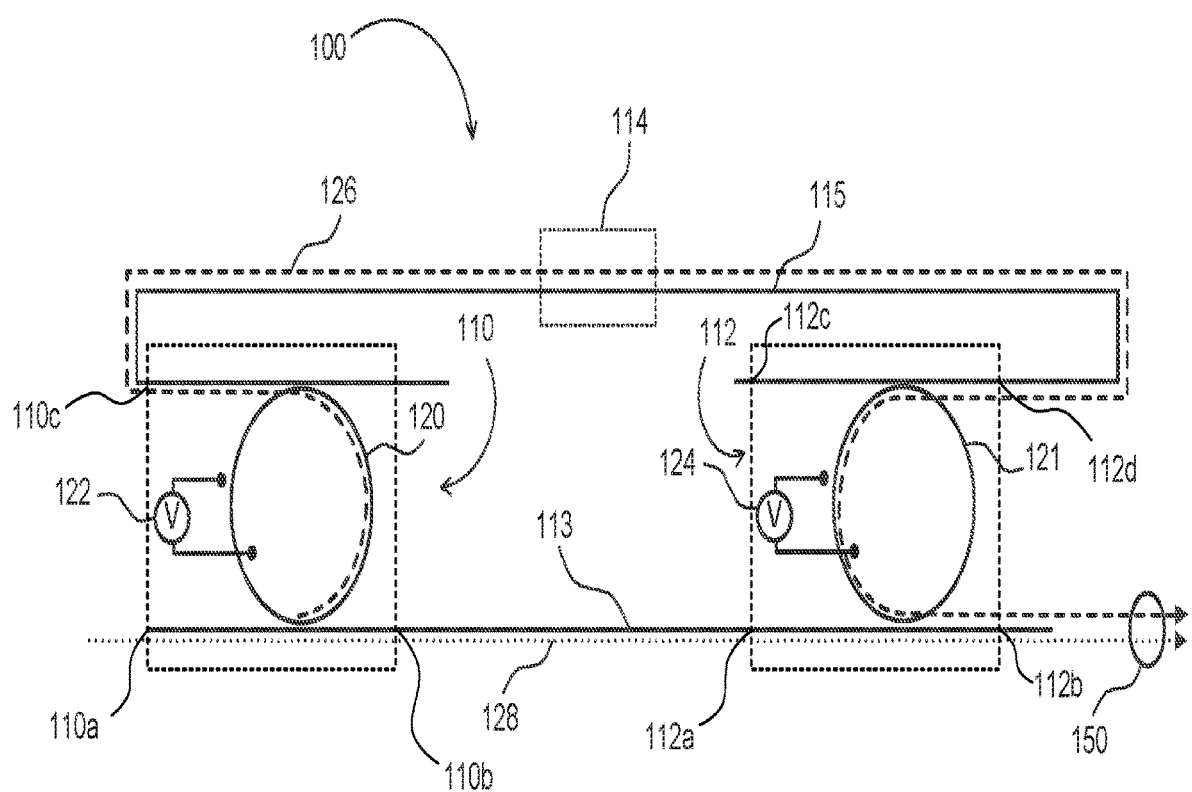
FIG. 1 is a schematic diagram of an optical dual ring modulator, in accordance with one embodiment.

With reference to FIG. 1, and in accordance with one embodiment, an optical dual ring modulator, generally referred to using the numeral 100, will now be described. In this particular example, the modulator 100 acts on an input optical signal having a designated optical frequency, and generally comprises first and second tunable ring modulators 110, 112 operable around the optical frequency and jointly defining sequential ring waveguides 120, 121 interposed between a bus waveguide path 128 and an opposed waveguide path 126.

The modulator 100 further comprises one or more components 114 optically coupled between the tunable ring modulators 110, 112 along a continuous waveguide 115 so to impart a relative optical phase shift between the bus waveguide path (indicated by dotted line 128) and the opposed waveguide path (indicated by dashed line 126). In this embodiment, a static 180-degree phase shift is applied between the modulators 110, 112 along the opposed waveguide path 126. In this embodiment, one or more components 114 is a static phase shifter which introduces the 180-degree phase shift with use of a fixed waveguide having the appropriate dimensions. As will be described in greater detail below, further phase and amplitude modulation components, fixed or tunable, may be integrated within this fundamental design to achieve greater signal modulation control and complexity.

In this example, the ring modulators 110, 112 are respectively driveable via respective drive voltages 122, 124 to modulate a respective resonance thereof in complimentary directions relative to the optical frequency and thereby resonantly redirect a selectable portion of the input optical signal along the opposed waveguide path 126 between the ring modulators 110, 112 such that the relative optical phase shift is imparted to this portion before being returned to the bus waveguide path for output at 150.

As can be seen, in this particular embodiment, and in those described below with reference to FIGS. 5 and 6, a common modulator output 150 is provided as output for each of the bus waveguide path and the opposed waveguide path.

As will be appreciated by the skilled artisan, the bus waveguide path 128 may consist of a single bus waveguide 113 to relay for output 150 a portion of the input optical signal modulated by the 'through' port of the ring modulators 120, 121. Likewise, the opposed waveguide path 126 between the ring modulators 110, 112 may consist of a continuous waveguide 115 relaying the redirected portion of the input optical signal modulated by the 'drop' port of ring modulators 120 and 121.

In the exemplary embodiment and modulator output results considered below, each ring modulator was designed to exhibit a tunability of approximately 30 pm/V, a radius of approximately 10 μm, and a Q value of 4500 to 5000, for example. The latter, which generally provides a measure of the ring resonance profile width, was deemed appropriate for bandwidth characteristics around 23 GHz, though other parameters and bandwidth characteristics may readily apply without departing from the general scope and nature of the present disclosure. The exemplary ring modulators were each based on a reverse-biased pn junction to provide high-speed modulation capability, and said modulators were tuned by integrated thermal tuners both to generally align the resonant wavelength to the input optical signal and also to bias the resonance peak of each resonator's transmission spectrum in such a way that the transmission peak of one resonator is at a longer wavelength than the input optical signal, and the transmission peak of the other resonator is at a shorter wavelength than that of the input optical signal. Other types of modulation mechanisms may also be considered, as will be appreciated by the skilled artisan, such as, but not limited to, leveraging the electro-optic effect of Silicon or a PIN injection modulator, for example. Generally, the rings were operated at critical or near-critical coupling, and back reflections were minimized.

In the exemplary implementation discussed below, each ring resonator was driven by a respective RF signal ranging between −0.4V and 1.6V. Given identical ring polarities, a differential drive mechanism was employed, whereby the first RF drive signal was applied between −0.4V and 1.6V as the second RF drive signal was concurrently applied between 1.6V and −0.4V. By inverting the polarity of the second ring resonator 112 relative to the first ring resonator 110, the differential drive mechanism could be eliminated. For example, the polarity of the implants could be reversed in one of the rings (i.e. Exchange p and n implants), which would allow the same drive voltage to be applied to both rings. It is here assumed that both rings have the proper DC bias voltage supplied, through the equivalent of a DC bias tee for example, such that the voltage ranges required for proper ring operation are excited by the input modulator voltage.

Figure 2:
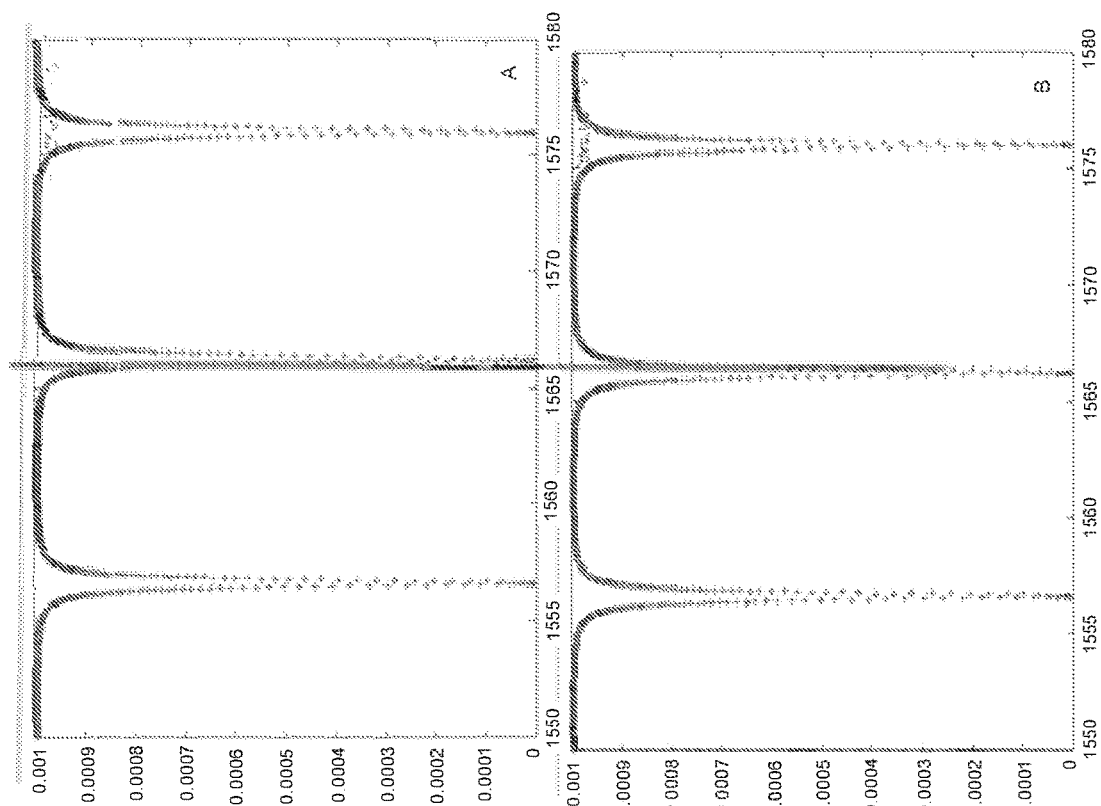
FIG. 2 shows two juxtaposed plots (A and B) illustrating opposed biases applied to respective optical ring modulators in achieving complimentary ring resonance shifts.

To achieve desired results, the otherwise identical ring resonators are oppositely biased as shown in FIG. 2, where plot A identifies the optical spectrum of the first ring modulator 110, whereas plot B identifies the optical spectrum of the second ring modulator 112. The vertical line indicates the wavelength of the input signal. As can be seen, a complimentary resonance shift is produced between modulator 110 and 112, i.e., the spectral transmittance of the two ring modulators shift to opposite directions relative to the input optical frequency. These complementary shifts include two contributions, shifts due to a static offset or biasing as well as shifts due to varying the drive voltage.

The static offset or bias is introduced so that when a same drive voltage magnitude is applied to both resonators, resonance peaks of the spectral transmittance of the two resonators are offset equally to opposite directions from the input optical signal wavelength. This static offset can be achieved with tunable elements such as the thermal tuners mentioned below which can be adjusted slowly to ensure the proper offset or by static and passive optical elements as known in the art which have undergone, for example, a precise dimension control fabrication process or post-process trimming. In order to maintain a proper offset under changing conditions, optical taps and/or photodetectors (not shown) may be utilized at any number of various locations to measure optical signals after passage through the resonators in order to keep the resonators biased up to the proper level. For example, drifting transmission spectra resulting from changes in temperature can be detected with taps or photodetectors at the output ports of each resonator, and compensated for by appropriate biasing.

By varying corresponding drive signal amplitudes to each ring resonator, a respective resonance thereof can be driven to approach and diverge from critical resonance with the input optical frequency from opposite directions on the rings' otherwise substantially identical spectral resonance curves. Although not shown explicitly in FIG. 2, it should be noted that the actual effect on the signals emerging from the resonators is more than simply a change in magnitude. Signals are modified according to a complex coefficient. It can be shown that the coefficient encountered by a signal on one side of the resonant wavelength is the complex conjugate of the coefficient encountered equidistant in wavelength and on the other side of the resonant wavelength. By driving the second resonator so that its resonant wavelength is equidistant and on the opposite side of the input optical signal frequency as the resonant wavelength of the first resonator, described in more detail below, the output, being a function of the product of the two, will remain on the real axis, and hence linear in the complex plane.

As noted above, ring modulators generally exhibit undesirable non-linear transitions at or near resonance as a function of applied voltage, thus making them generally unsuitable for coherent modulation transmission systems. However, by operating oppositely biased ring resonators via complimentary drive signals, as in the embodiments illustrated herein, the undesirable non-linear nature of these ring resonators can be sufficiently suppressed to produce a substantially linear response in the complex plane as a function of applied voltage.

Figure 3A:
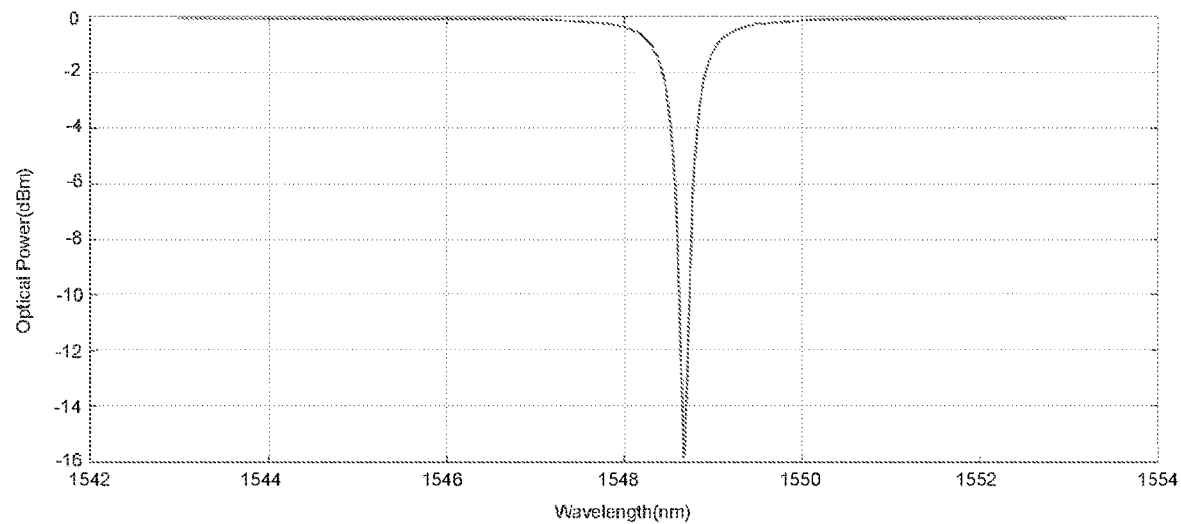
FIG. 3A illustrates a transmission spectrum of a typical resonator at its through port.
Figure 3B:
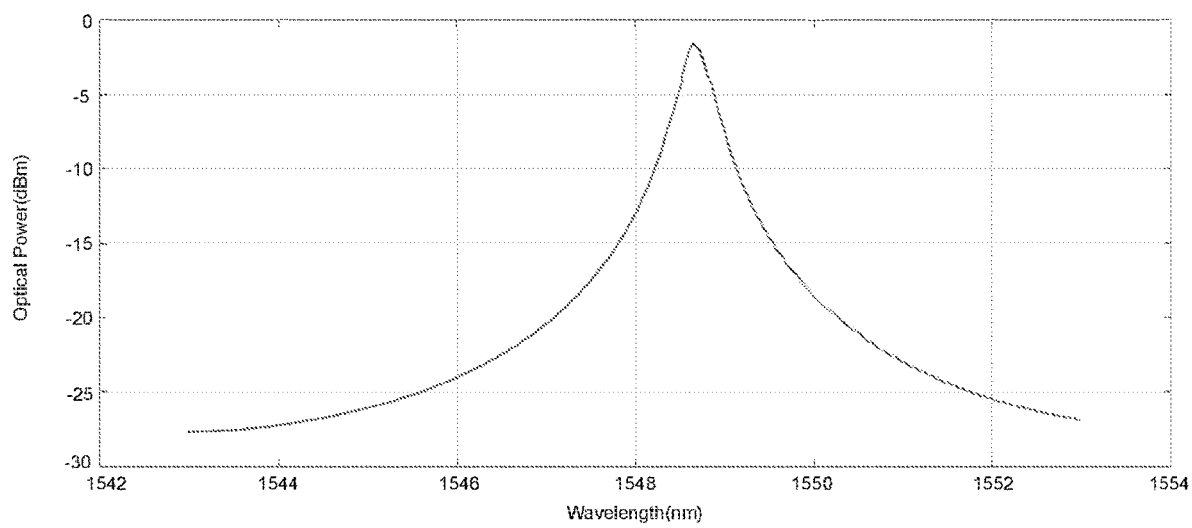
FIG. 3B illustrates a transmission spectrum of a typical resonator at its drop port.

Referring now also to FIGS. 3A and 3B this linear response is described with reference to the typical optical response spectra of the through and drop ports of an optical resonator such as the ring resonators of FIG. 1. Given an input optical signal at an input port 110a of the first resonator 110, the portion of the optical signal which proceeds from a through port 110b of the first resonator 110 and along the bus waveguide path 128, exhibits an optical transmission spectra as illustrated in FIG. 3A. It should be noted that FIGS. 3A and 3B illustrates the typical response of any optical resonator and not just the ring resonators of FIG. 1. Given the input optical signal at the input port 110a of the first resonator 110, the waveguide 115 where it emerges from the resonator 110 functions as a drop port 110c, and the optical signals proceeding through the continuous waveguide 115 on the opposed path 126 exhibit the transmission spectra illustrated in FIG. 3B.

Given the optical signal at an opposed input port 112d of the second resonator 112 where the waveguide 115 merges with the second resonator 112, an output 112b of the second resonator 112 functions as a drop port. A portion of the optical signals proceeding through the continuous waveguide 115 on the opposed path 126 undergoes a second optical transformation according to the transmission spectra illustrated in FIG. 3B but being the complex conjugate of that encountered at the first resonator 110. The portion of the signals output at the resonator output 150 which traversed opposed waveguide path 126, therefore, are real valued.

Given the optical signal at a bus input port 112a of the second resonator 112 where the bus waveguide 113 merges with the second resonator 112, the output 112b of the second resonator 112 functions as a through port. A portion of the optical signals proceeding through the bus waveguide 113 on the bus waveguide path 126 undergoes a second optical transformation according to the transmission spectra illustrated in FIG. 3A but being the complex conjugate of that encountered at the first resonator 110. The portion of the signals output at the resonator output 150 which traversed bus waveguide path 127, therefore, are real valued.

The total output at 150 includes a superposition of signals which are real valued, and are thus also in the real axis and linear in the complex plane.

Accordingly, by applying complimentary RF drive signals to the dual ring modulator, for example, the modulator output can be linearly modulated between "−1", "0" and "1" states. Namely, and with reference to FIG. 4A, operation of the dual ring modulator, as described and characterized above, at −0.1V drive voltage increments between −0.4 and 1.6V for the first ring 110, and 1.6V and −0.4V for the second ring 112, resulted in a modulated signal output that varies substantially linearly across the complex plane to define "−1", "0" and "1" states. For instance, a "−1" state may be defined by a condition in which a predominant portion of the input optical signal travels substantially unperturbed by the ring waveguides 120, 121 along the bus waveguide path 128, namely where a respective ring resonance offset is maximized relative to the input optical frequency. Conversely, by driving the respective ring resonators 110, 112 to substantially align the a resonance thereof with the input optical frequency, a maximal portion of the input optical signal is redirected by the resonant ring waveguides 120, 121 along the opposed waveguide path 126, to which a static 180 degree phase shift (in an idealized configuration) may be imparted relative to the bus waveguide path in defining the "1" state. Finally, a "0" state may be linearly achieved at an intermediate resonance offset where substantially equivalent portions of the input optical signal travel along each of the bus and opposed waveguide paths. Accordingly, such operation may be applied to form one of the quadrature components of an IQ modulator, as noted above. FIG. 4B illustrates a similar plot in the context of a constellation of BPSK modulation produced by the dual ring modulator.

The Table below provides an illustrative set of operating characteristics for the embodiment depicted in FIG. 1 and characterized by the above ring parameters. Namely, respective drive voltages are identified for the first and second ring modulators for each of the resulting "1", "0" and "−1" states. A measure of the combined operating and static output losses as compared to input is also provided for each of these states. The person of ordinary skill in the art will appreciate the high "loss" expected for the "0" state as it should in fact represent a zero output. It is rather the power at the "1" and "−1" states that determine insertion loss.

| State | V1 (first ring) | V2 (second ring) | Loss compared to input (dB) |
|---|---|---|---|
| "1" | −0.4 | 1.6 | −14.0 |
| "0" | 0.6 | 0.6 | −25.7 |
| "−1" | 1.6 | −0.4 | −14.0 |

While the operating regime of the illustrative implementation described herein was not perfectly balanced to be centered on 0 in this exemplary implementation, one would predictively expect a balanced value to achieve an overall combined static and operation loss of approximately 14 dB for the "1" and "−1" states. In comparison, current TWMZ modulators commonly exhibit combined operation and static losses around 17.4 dB.

Figure 5:
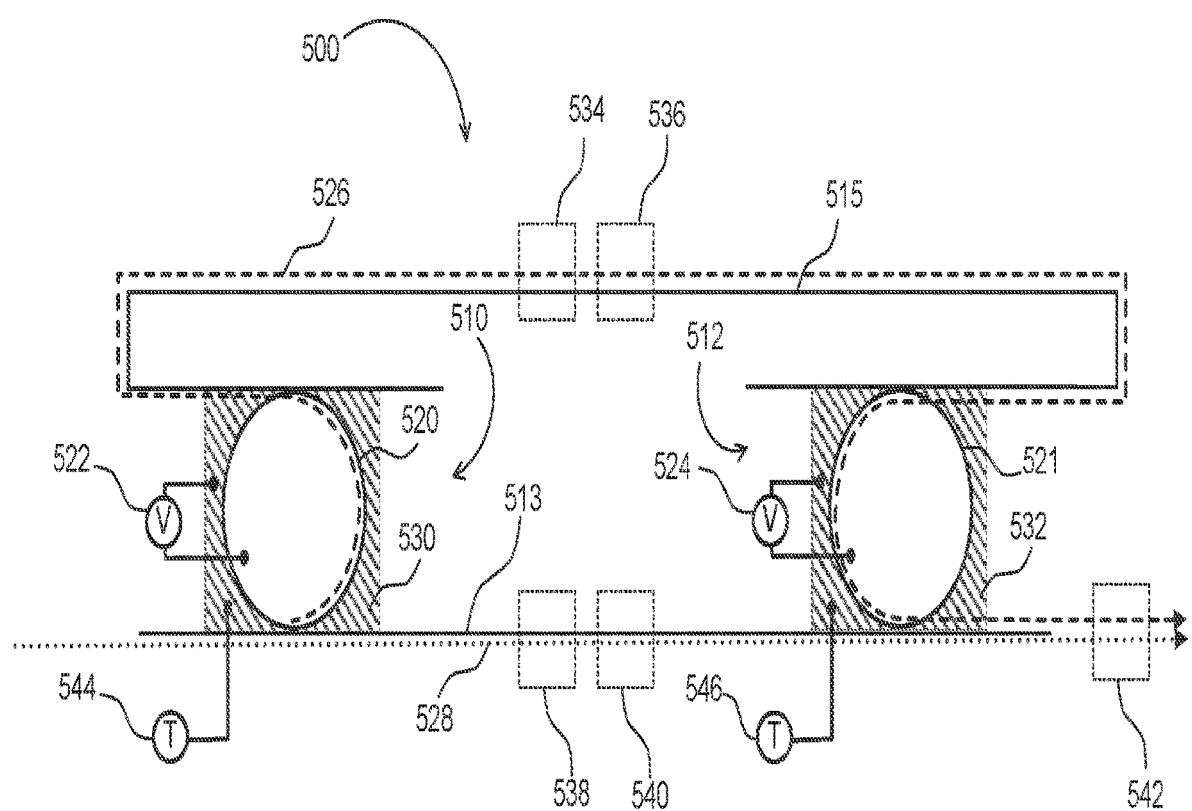
FIG. 5 is a schematic diagram of an optical dual ring modulator, in accordance with another embodiment.

With reference to FIG. 5, and in accordance with another embodiment, an optical dual ring modulator, generally referred to using the numeral 500, will now be described. In this particular example, the modulator 500 again acts on an input optical signal having a designated optical frequency, and generally comprises first and second tunable ring modulators 510, 512 operable around the optical frequency and jointly defining sequential ring waveguides 520, 521 interposed between a bus waveguide path 528 and an opposed waveguide path 526.

In this embodiment, each of the bus and opposed waveguide paths comprise a respective variable amplitude attenuator (VOA) 538, 534 and a respective phase shifter in the form of a tunable phase modulator (ΔΦ)) 540, 536, which enable the optical phase and intensity to be controlled along each path such that the most favorable interference between the two rings is achieved. This can further allow an increase in output linearity along the complex plane as a function of the RF drive voltage.

In this example, a further phase modulator 542 is provided at the modulator output to ensure a consistent alignment of the modulator output along a desired axis in the complex plane, for example, in the provision of a given quadrature component for an IQ modulator (i.e. output state variations confined to the real or imaginary axis of the complex plane).

Once again, the ring modulators 510, 512 are respectively driveable via respective drive voltages 522, 524 to modulate a respective resonance thereof in complimentary directions relative to the input optical frequency and thereby resonantly redirect a selectable portion of the input optical signal away from the bus waveguide path 528 and the bus waveguide 513 and along the opposed waveguide path 526 through continuous waveguide 515. Further respective thermal tuners 530, 532 are also provided in this example to adjust a general tuning of each ring modulator 510, 512, namely to perform a static (i.e. slower) tuning of the modulators as a function of an applied temperature 544, 546 to shift a resonance of the rings in a range of the designated input optical frequency in question, upon which a faster modulation may be applied via the applied RF voltages 522, 524. For instance, the presence of the thermal tuner allows the location of the resonance peak of the rings to be tuned across a wide range at slow speed, which is helpful in properly biasing the rings. Other slow tuners, such as a PIN injection modulator, could also be used, for example.

It should be understood from the above described embodiments discussed in connection with FIGS. 1, 2, 3A, 3B, 4A, and 4b, that the dual resonator modulator can be utilized for pure ASK and pure PSK modulation as long as the resonator, variable amplitude attenuator, and/or tunable phase shifter are driven in concert to achieve the desired type and order of ASK or PSK.

Figure 6:
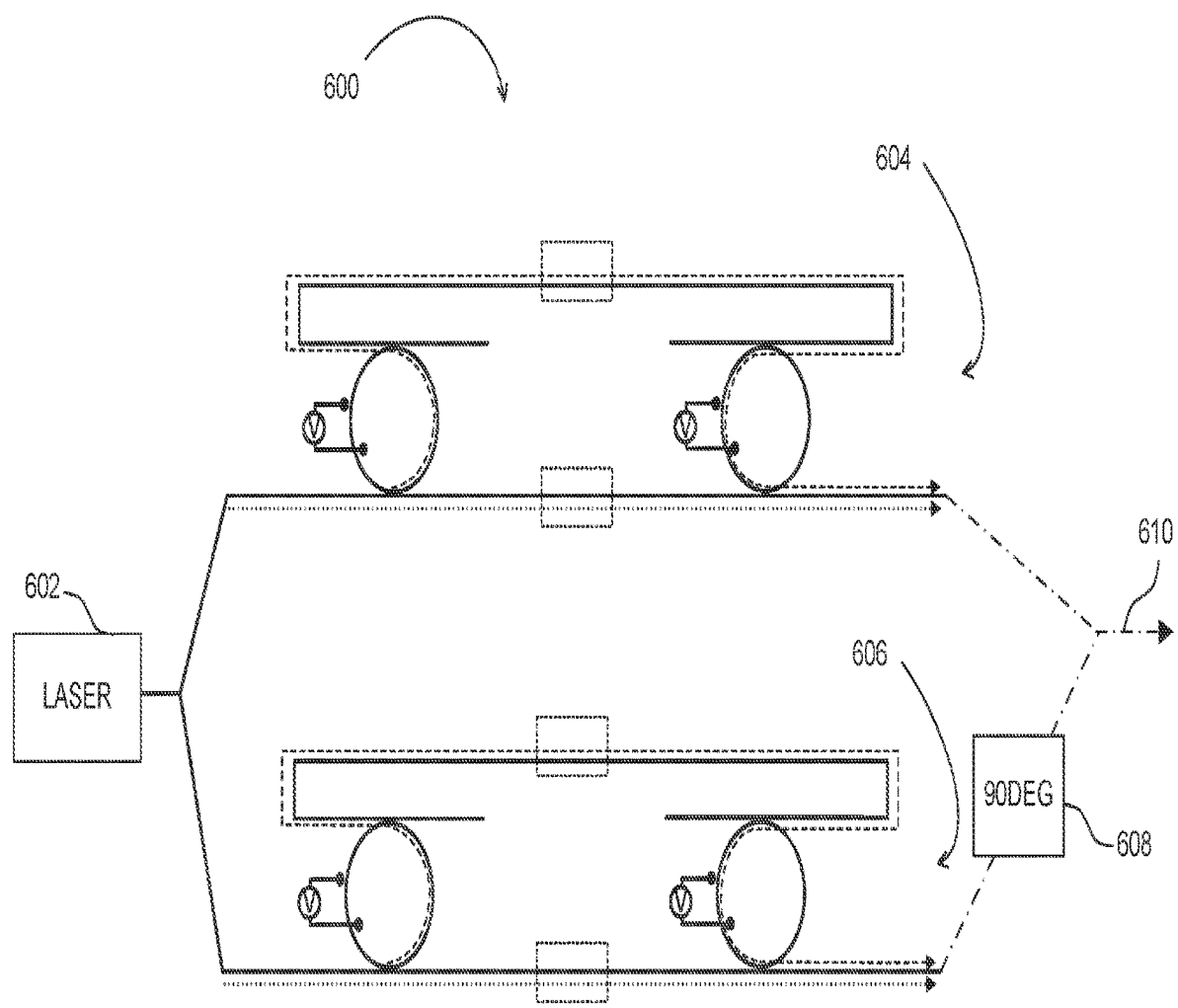
FIG. 6 is a schematic diagram of an IQ modulator consisting of a pair of optical dual ring modulators, in accordance with one embodiment.

With reference to FIG. 6, and in accordance with one embodiment, an IQ modulator 600 is illustrated to split a source laser input 602 between a pair of optical dual ring modulators 604 and 606 as described above, the respective output signals of which being phase-shifted by 90 degrees (608) to produce each quadrature component of the combined IQ modulator output 610. Such an IQ modulator 600 can be utilized for QPSK modulation, a constellation of which is illustrated in FIG. 7.

Figure 7:
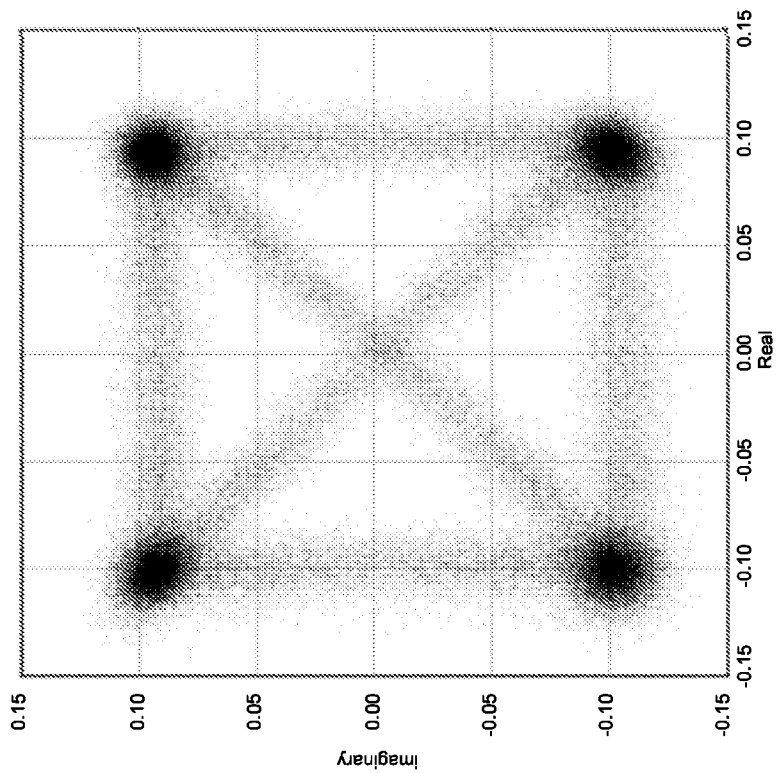
FIG. 7 is a complex plane plot illustrating the constellation of quadrature phase shift keying (QPSK) modulation of the IQ modulator embodiment of FIG. 6.

FIG. 7 illustrates a plot in the complex plane of a constellation of QPSK modulation produced by the IQ modulator described in connection with FIG. 6. It should be understood by extension from this example that multiple dual resonators may be utilized in various combinations to achieve higher order modulation schemes such as 8QAM, 16QAM, etc.

Figure 8:
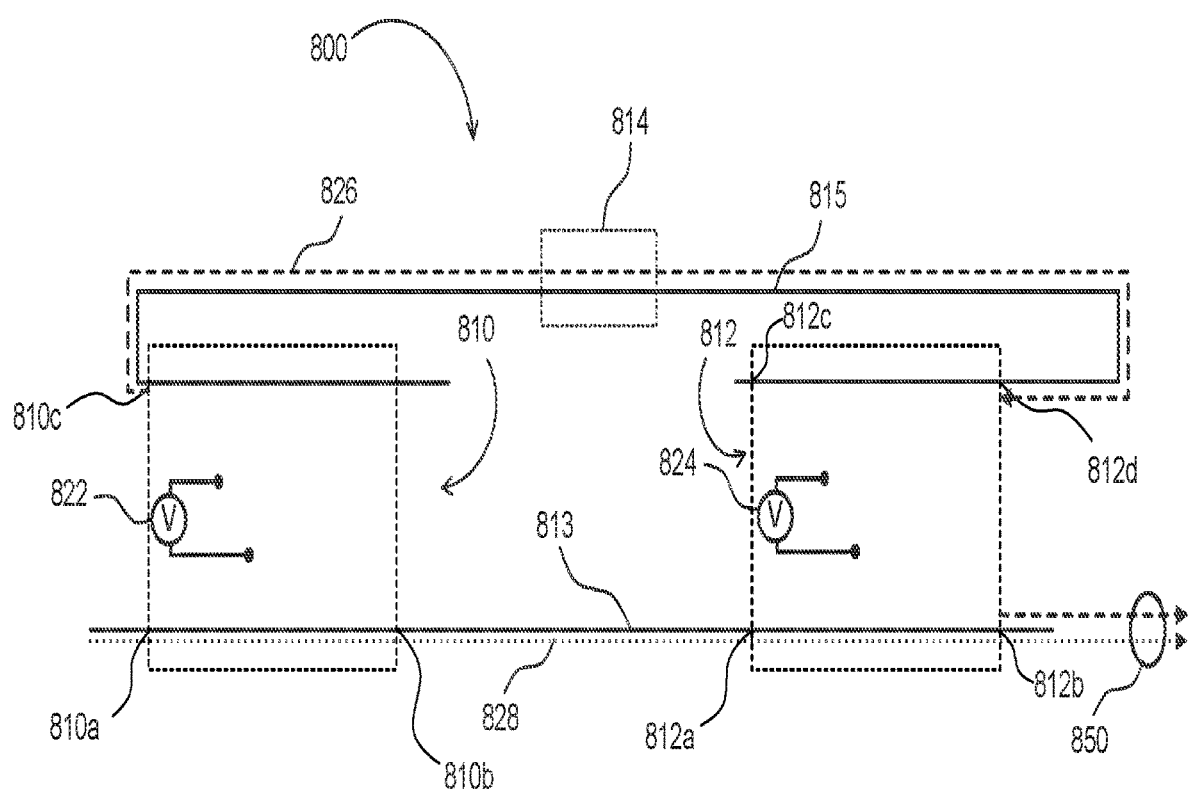
FIG. 8 is a schematic diagram of a generic dual resonator optical modulator in accordance with a further embodiment.

With reference to FIG. 8, and in accordance with a further embodiment, an optical dual modulator, generally referred to using the numeral 800, will now be described. In this particular example, the modulator 800 acts on an input optical signal having a designated optical frequency, and generally comprises first and second tunable optical modulators 810, 812 operable around the optical frequency and coupled together by a bus waveguide path 828 and an opposed waveguide path 826. The first modulator has an input port 810a, a through port 810b, and a drop port 810c. The second modulator has a bus input port 812a, an opposed input port 812d, a dump port 812c, and an output port 812b which functions as a through port in respect of signals input over the bus input port 812a and also functions also as a drop port in respect of signals input over the opposed input port 812d.

The modulator 800 further comprises one or more components 814 optically coupled between the tunable optical modulators 810, 812 along a continuous waveguide 815 so to impart a relative optical phase shift between the bus waveguide path (indicated by dotted line 828) and the opposed waveguide path (indicated by dashed line 826). In this embodiment, a static 180-degree phase shift is applied between the modulators 810, 812 along the opposed waveguide path 826. As described hereinabove, one or more components 814 may achieve phase shifting with use of a static or passive phase shifter or an active tunable phase shifter.

In this example, the optical modulators 810, 812 are respectively driveable via respective drive voltages 822, 824 to modulate a respective resonance thereof in complimentary directions relative to the input optical signal frequency and thereby resonantly redirect a selectable portion of the input optical signal along the opposed waveguide path 826 between the optical modulators 810, 812 such that the relative optical phase shift is imparted to this portion before being returned to the bus waveguide path for output at 850.

As can be seen, in this particular embodiment, as with the other embodiments hereinabove, a common modulator output 850 is provided as output for each of the bus waveguide path and the opposed waveguide path.

As will be appreciated by the skilled artisan, the modulator 800 functions substantially the same as the dual ring modulator 100 described hereinabove. Since the transmission spectra of optical modulators is similar for any number of optical modulators, both for their drop ports as illustrated in FIG. 3A and their through ports as illustrated in FIG. 3B, driving two identical resonators so that their resonant wavelengths are on opposite sides of the input optical frequency in opposite directions creates an output signal advantageously in the real axis as described above.

It is to be understood that the first and second optical resonators 810, 812 could be based on ring modulators, disc modulators, distributed Bragg grating resonators, photonic crystal resonators, or any other similar or generic optical resonator which exhibits similar response spectra, can be driven so such that their resonant wavelengths are on either side of the input optical wavelength, and can be configured to function with one or two input ports as described hereinabove.

In one embodiment, the resonators, which may be rings or other structures, are driven in a complimentary fashion as follows: If the two resonators are constructed such that both have the same polarity, meaning that positive RF drive voltage shifts the resonance peak towards longer wavelengths, then the RF signal provided to each resonator should be anti-correlated. When one resonator is being driven to high voltage, the other would be driven to low voltage, and vice versa. This accomplishes the goal of shifting the resonance peak of one resonator toward longer wavelengths, and the resonance peak of the other resonator toward shorter wavelengths. In an alternative embodiment, the resonators could be constructed such that the same polarity of RF drive voltage could be supplied to both resonators, but their resonance shifts would be anti-correlated. This could be accomplished for instance by altering the arrangement of doping between the first and the second resonators; by reversing the doping polarity, for instance, the same voltage could drive the resonance of one resonator toward longer wavelengths and the other toward shorter wavelengths.

Figure 9:
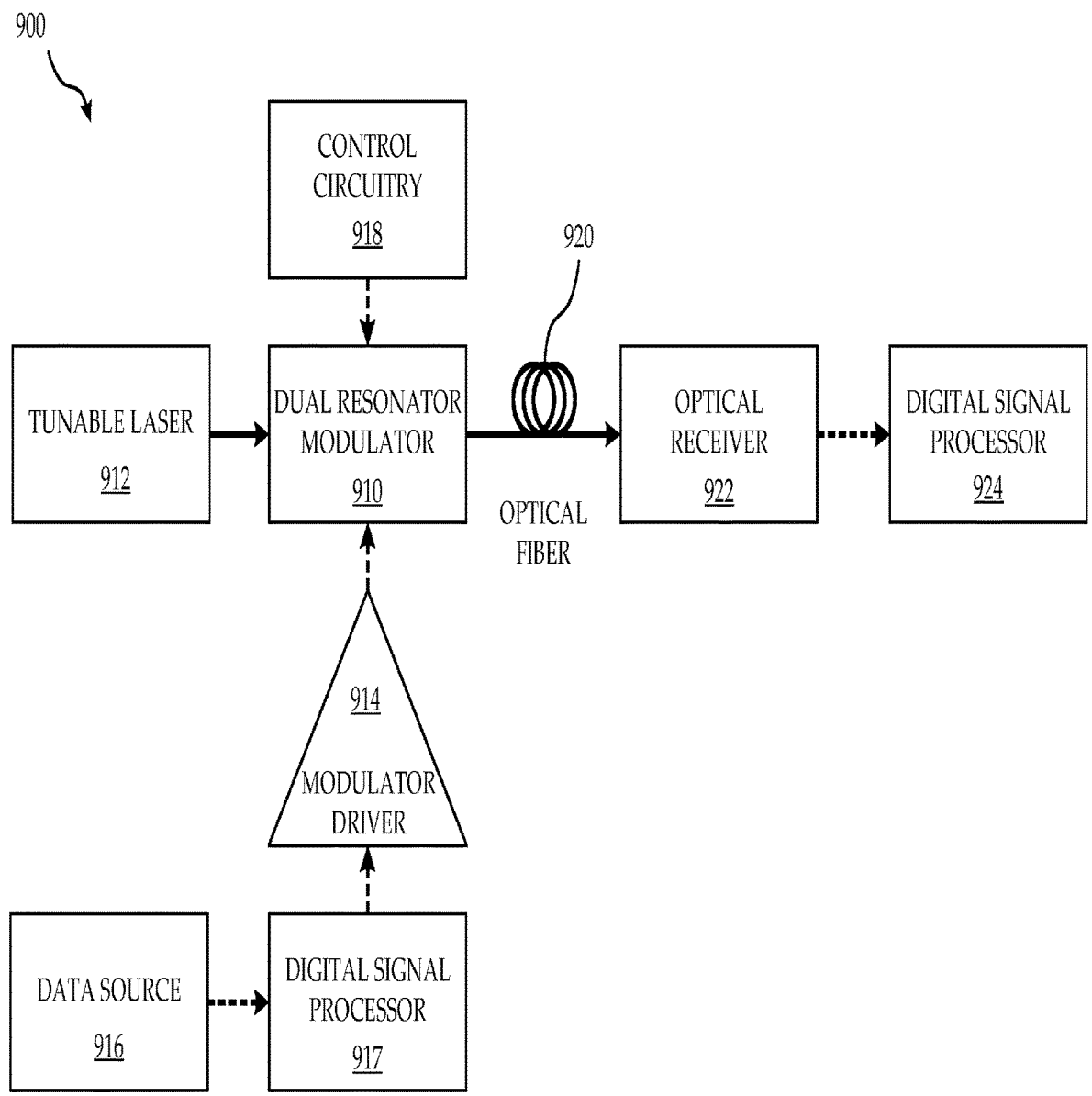
FIG. 9 illustrates an optical link utilizing a dual resonator modulator linearly driven according to a further embodiment.

Referring now to FIG. 9, an optical link 900 utilizing a tunable laser 912 and a dual resonator modulator 910 linearly driven according to a further embodiment will now be described. The dual resonator modulator 910 accepts an input optical signal from a tunable laser 912 to which it is optically coupled. The output of the dual resonator modulator 910 is coupled to an optical fiber 920 utilized for the optical link 900. The modulator driver 914 provides electrical signals to modulate the dual resonator modulator 910 as described herein and in response to signals received from the data source 916 after their having been processed by digital signal processor 917. In FIG. 9, the modulator driver 914 drives the dual resonator modulator 910 in a linear fashion in response to the linear signal processing by the digital signal processor 917 of the data received from the data source 916. In some embodiments the modulator driver 914 drives the dual resonator modulator 910 as described above to ensure linearity and output on the real axis. A control circuitry 918 is electrically coupled to the dual resonator modulator to monitor and control biasing and other aspects of the operation of the dual resonator modulator 910. Modulated optical signals traverse the optical fiber 920 and are received at an optical receiver 922 which converts the optical signals to electrical signals which are processed by a digital signal processor 924.

In the embodiment depicted in FIG. 9, and generally in any embodiment utilizing a tunable laser and a dual resonator modulator according to an embodiment, the technique of driving two resonators in complimentary fashion as described hereinabove is modified to the extent the tunable laser is utilized in cooperation with the resonator modulator to achieve substantially the same results. For example, instead of driving each resonator so that its transmission spectra are biased and driven in opposite directions about the wavelength of the optical signal produced by the laser, some embodiments include a fixed resonator and a tunable resonator. In those embodiments the tunable laser may be driven on one side of the resonance peak of the transmission spectra of the fixed resonator, while the tunable resonator would be driven such that the wavelength of the optical signal produced by the tunable laser remains on the opposite side of the resonance peak of its transmission spectra, and driven in a complimentary fashion taking into account that the tunable laser is not producing an optical signal with a fixed wavelength.

Figure 10:
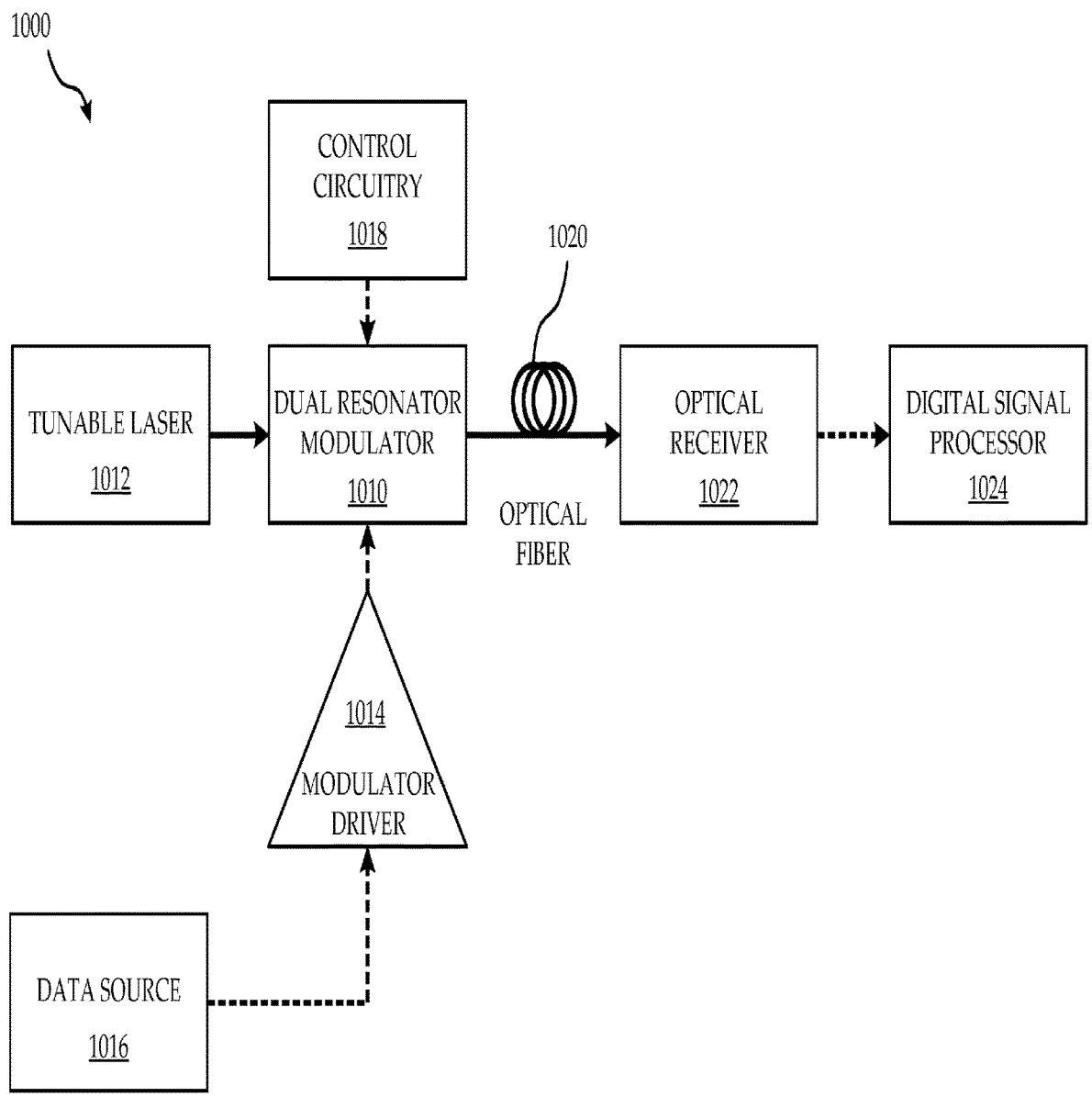
FIG. 10 illustrates a further optical link utilizing a dual resonator modulator utilizing a limiting driver according to a further embodiment.

Referring now to FIG. 10, an optical link 1000 utilizing a tunable laser 1012 and a dual resonator modulator 1010 driven utilizing a limiting driver according to a further embodiment will now be described. The dual resonator modulator 1010 accepts an input optical signal from a tunable laser 1012 to which it is optically coupled. The output of the dual resonator modulator 1010 is coupled to an optical fiber 1020 utilized for the optical link 1000. The modulator driver 1014 provides electrical signals to modulate the dual resonator modulator 1010 as described herein and in response to signals received from the data source 1016. In FIG. 10, the modulator driver 1014 drives the dual resonator modulator 1010 in a limiting driver fashion directly in response to the data received from the data source 1016. In some embodiments the modulator driver 1014 drives the dual resonator modulator 1010 as described above so as to achieve improved linearity. A control circuitry 1018 is electrically coupled to the dual resonator modulator 1010 to monitor and control biasing and other aspects of the operation of the dual resonator modulator 1010. Modulated optical signals traverse the optical fiber 1020 and are received at an optical receiver 1022 which converts the optical signals to electrical signals which are processed by a digital signal processor 1024.

As will be understood by skilled persons in the art, tunable optical resonators according to the embodiments described, are driven so that their transmission spectra and in particular resonance peaks thereof are tunable. Generally speaking resonators can be tuned by any combination of tuning techniques which achieve shifting of their resonance peaks including thermal tuning and carrier-injection tuning techniques which are well suited for relatively slow biasing, carrier-depletion tuning techniques well suited for controlling relatively fast modulation, and hybrid material techniques for tuning including polymer based (fast) and liquid crystal based (slow) tuning.

As will be appreciated by the skilled artisan, implementation of a modulators as considered herein in accordance with some embodiments may provide for a coherent modulation transmission system that exhibits lower insertion losses as compared to known techniques, that has a much smaller size on chip, and that may require significantly less drive power to operate. Improved optical signal to noise ratios (OSNR) may also be expected. These features may be particularly attractive in the manufacture of products involving coherent transmissions, such as, but not limited to, transceivers or transmitters that generate BPSK or QPSK modulation formats, or the like.

As introduced above, one of the current challenges in known coherent transmission systems involves the relatively high insertion loss and/or modulator drive power involved in the operation of the Mach-Zehnder modulators common in those systems, not to mention the relatively large area of the die consumed for such implementations. In comparison, some embodiments as described herein can potentially significantly reduce insertion losses and power requirements, and also result in a system with a relatively small die footprint. For example, in accordance with some embodiments, contemplated ring modulators can typically be realized with geometries having a radius 10 μm or less, which translates in a much smaller modulation system footprint than what may otherwise be required for the implementation of a traveling-wave Mach-Zehnder (TWMZ) modulator that can be 3 mm or longer. As the length of the modulation junction can thus be vastly reduced, so can the RF power consumption be comparatively reduced.

Further, given the dual ring modulator designs contemplated herein that invoke complimentary portions of the rings' resonance curve to modulate an input optical signal, a substantially linear path can be maintained through the output optical complex plane, namely by providing a solution to the otherwise non-linear variations exhibited by such ring modulators near resonance which heretofore has rendered use of such modulators unfavourable for coherent implementations.

Although the above has described dual resonator modulators in the context of applications which benefit from improved linearity, it should be understood that the dual resonator modulators described herein may be driven and/or biased according to the requirements of other applications, and therefore nonlinear operation of the dual resonator modulators is also contemplated.

Although the above has described specific modulator embodiments in which the pair of ring or other resonators are identical, it is to be understood that a modulator's resonators need not be identical to each other. Pairings of sufficiently similarly functioning resonators are contemplated as long as they have sufficiently similar resonance spectra which can tuned about the wavelength of the input optical signal in the manner described above.

While the present disclosure describes various exemplary embodiments, the disclosure is not so limited. To the contrary, the disclosure is intended to cover various modifications and equivalent arrangements included within the general scope of the present disclosure.

We claim:

1. An optical modulator for modulating an input optical signal including an input optical signal frequency, the optical modulator comprising:
a bus waveguide path;
an opposed waveguide path;
a first optical resonator and a second optical resonator interposed in parallel between the bus waveguide path and the opposed waveguide path;
a first driver and a second driver configured to tune resonant peaks of the first optical resonator and the second optical resonator, respectively, for redirecting a selectable portion of the input optical signal from the bus waveguide path, along the opposed waveguide path, and returning back to the bus waveguide path; and
an optical phase-shifter configured to impart a relative optical phase shift between the bus waveguide path and the opposed waveguide path.

2. The optical modulator according to claim 1, wherein the first optical resonator comprises a light source port for receiving the input optical signal, a first through port, and a first drop port;
wherein the bus waveguide path is optically coupled to the first through port;
wherein the opposed waveguide path is optically coupled to the first drop port; and
wherein the second optical resonator comprises:
a first input port optically coupled via the bus waveguide path to the first through port;
a second input port optically coupled via the opposed waveguide path to the first drop port; and
an output port operable as a second through port and a second drop port for optical signals received respectively at the first input port and the second input port.

3. The optical modulator according to claim 1, wherein the first optical resonator comprises a first ring resonator, and the second optical resonator comprises a second ring resonator.

4. The optical modulator according to claim 1, wherein the first optical resonator and the second optical resonator are oppositely biased; and wherein the first driver and the second driver apply complementary drive signals to the first optical resonator and the second optical resonator, respectively.

5. The optical modulator according to claim 1, wherein a first resonant wavelength of the first optical resonator is equidistant and on an opposite side of the input optical signal frequency than a second resonant wavelength of the second optical resonator.

6. The optical modulator according to claim 5, further comprising a thermal tuner for each of the first optical resonator and the second optical resonator configured to adjust the first resonant wavelength and the second resonant wavelength, to ensure that the first resonant wavelength is equidistant and on the opposite side of the input optical signal frequency than the second resonant wavelength.

7. The optical modulator according to claim 5, wherein the first optical resonator and the second optical resonator are of a substantially similar polarity; and wherein the first driver and the second driver are configured to apply anti-correlated RF signals to the first and second optical resonators, respectively.

8. The optical modulator according to claim 5, wherein the first optical resonator and the second optical resonator are of substantially reverse polarities; and wherein the first driver and the second driver are configured to apply correlated RF signals to the first and second optical resonators, respectively.

9. The optical modulator according to claim 1, wherein the optical phase-shifter comprises a static 180° phase shift.

10. The optical modulator according to claim 1, wherein the optical phase-shifter comprises a tunable phase modulator.

11. The optical modulator according to claim 1, further comprising a variable optical attenuator optically coupled between the first optical resonator and the second optical resonator along at least one of said bus waveguide path and said opposed waveguide path.

12. The optical transmitter according to claim 1, wherein each of the first optical resonator and the second optical resonator comprises a resonator selected from the group consisting of a disc modulator, a distributed Bragg grating resonator, and a photonic crystal resonator.

13. A method of modulating an input optical signal including an input optical signal frequency, the method comprising:
providing a first optical resonator and a second optical resonator interposed in parallel between a bus waveguide path and an opposed waveguide path;
receiving the input optical signal on the bus waveguide path;
tuning resonant peaks of the first optical resonator and the second optical resonator, for redirecting a selectable portion of the input optical signal from the bus waveguide path, along the opposed waveguide path, and returning back to the bus waveguide path; and
imparting a relative optical phase shift between the bus waveguide path and the opposed waveguide path.

14. The method according to claim 13, wherein the first optical resonator and the second optical resonator are oppositely biased; and wherein the step of tuning the resonant peaks comprises applying complementary drive signals to the first optical resonator and the second optical resonator.

15. The method according to claim 13, wherein a first resonant wavelength of the first optical resonator is equidistant and on an opposite side of the input optical signal frequency than a second resonant wavelength of the second optical resonator.

16. The method according to claim 15, further comprising tuning at least one of the first optical resonator and the second optical resonator to adjust the first resonant wavelength and the second resonant wavelength, to ensure that the first resonant wavelength is equidistant and on the opposite side of the input optical signal frequency than the second resonant wavelength.

17. The method according to claim 15, wherein the first optical resonator and the second optical resonator are of a substantially similar polarity; and wherein the step of tuning the resonant peaks includes applying anti-correlated RF signals to the first optical resonator and the second optical resonator.

18. The method according to claim 15, wherein the first optical resonator and the second optical resonator are of substantially reverse polarities; and wherein the step of tuning the resonant peaks includes applying correlated RF signals to the first optical resonator and the second optical resonator.

19. The method according to claim 13, wherein the step of imparting the relative optical phase shift comprises imparting a 180° phase shift in the bus waveguide path.

20. The method according to claim 13, further comprising controlling optical phase and intensity along each of the bus waveguide path and the opposed waveguide path to achieve favorable interference between the first optical resonator and the second optical resonator.

* * * * *